United States Patent
Warashina et al.

(10) Patent No.: US 11,995,742 B2
(45) Date of Patent: May 28, 2024

(54) IMAGE PROCESSING APPARATUS

(71) Applicant: FANUC CORPORATION, Yamanashi (JP)

(72) Inventors: Fumikazu Warashina, Yamanashi (JP); Yuutarou Takahashi, Yamanashi (JP); Wanfeng Fu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 28 days.

(21) Appl. No.: 16/885,733

(22) Filed: May 28, 2020

(65) Prior Publication Data

US 2021/0019920 A1     Jan. 21, 2021

(30) Foreign Application Priority Data

Jul. 19, 2019   (JP) .................................. 2019-133786

(51) Int. Cl.
  *G06T 11/00*   (2006.01)
  *G06T 7/11*   (2017.01)
  *G06T 7/90*   (2017.01)

(52) U.S. Cl.
  CPC .............. *G06T 11/001* (2013.01); *G06T 7/11* (2017.01); *G06T 7/90* (2017.01); *G06T 2200/24* (2013.01); *G06T 2207/10024* (2013.01)

(58) Field of Classification Search
  CPC . G06T 7/11; G06T 7/90; G06T 11/001; G06T 11/60; G06T 2200/10024; G06T 2200/24; G06T 2207/10024
  See application file for complete search history.

(56) References Cited

U.S. PATENT DOCUMENTS 5,231,482 A * 7/1993 Murakami ............. H04N 1/642
                                                                358/520
5,874,988 A * 2/1999 Gu .......................... H04N 9/74
                                                                348/E9.037

(Continued)

FOREIGN PATENT DOCUMENTS

CN        101101629 A      1/2008
EP        2434745 A2       3/2012

(Continued)

OTHER PUBLICATIONS

Search Report issued Mar. 8, 2023, in corresponding Japanese Application No. 2019133786, 35 pages (with machine-generated English translation).

(Continued)

*Primary Examiner* — Manav Seth
(74) *Attorney, Agent, or Firm* — Maier & Maier, PLLC

(57) ABSTRACT

An image processing apparatus includes a graphical image generator that generates a first graphical image and a second graphical image, and a mode switching unit that switches between a first display mode and a second display mode so that a display displays the first graphical image or the second graphical image. Each graphical image includes a color wheel indicating a two-dimensional color space of hue and saturation and a lightness bar indicating a one-dimensional color space of lightness. In the first graphical image, each position in the color wheel and the lightness bar is indicated by the hue and saturation indicated by that position. In the second graphical image, a distribution of colors included in the color image in the color space of hue and saturation or the color space of lightness is superposed on the color wheel and the lightness bar.

9 Claims, 6 Drawing Sheets

(56) References Cited

U.S. PATENT DOCUMENTS

| | | | | |
|---|---|---|---|---|
| 6,201,548 B1* | 3/2001 | Cariffe | G06T 11/60 | 345/620 |
| 7,714,874 B2* | 5/2010 | Jang | G06T 11/001 | 358/518 |
| 8,081,193 B2* | 12/2011 | Jang | G06T 11/001 | 358/518 |
| 8,098,259 B2* | 1/2012 | Kondo | G09G 5/02 | 345/594 |
| 8,326,035 B2* | 12/2012 | Ubillos | H04N 1/608 | 382/167 |
| 8,418,059 B2* | 4/2013 | Kitada | G06F 3/04847 | 715/275 |
| 9,947,115 B2* | 4/2018 | Collopy | G06F 3/04847 | |
| 2004/0004626 A1* | 1/2004 | Ida | H04N 1/6011 | 345/626 |
| 2004/0101162 A1* | 5/2004 | Higaki | G06V 20/64 | 382/106 |
| 2007/0076277 A1* | 4/2007 | Miyawaki | G06T 7/90 | 358/520 |
| 2008/0068487 A1* | 3/2008 | Morita | H04N 23/61 | 345/428 |
| 2009/0226038 A1* | 9/2009 | Takei | G06F 16/00 | 382/103 |
| 2009/0237523 A1* | 9/2009 | Date | H04N 23/635 | 348/E9.037 |
| 2009/0278959 A1* | 11/2009 | Kato | H04N 5/2621 | 348/E5.051 |
| 2010/0260413 A1* | 10/2010 | Yamazaki | G06T 5/009 | 382/164 |
| 2010/0278425 A1* | 11/2010 | Takemoto | G06T 7/10 | 382/173 |
| 2011/0234614 A1* | 9/2011 | Ohyama | G09G 5/06 | 345/589 |
| 2012/0075645 A1 | 3/2012 | Katayama et al. | | |
| 2012/0213431 A1* | 8/2012 | Fujii | G06V 30/413 | 382/164 |
| 2015/0199570 A1* | 7/2015 | Lee | G06V 10/945 | 382/103 |
| 2015/0269748 A1* | 9/2015 | Osamura | G06V 40/113 | 382/165 |
| 2016/0163066 A1* | 6/2016 | Ishihara | G06F 18/22 | 382/162 |
| 2017/0039683 A1* | 2/2017 | Yamamoto | G06F 3/04842 | |
| 2019/0354742 A1* | 11/2019 | Murakoshi | G06V 20/64 | |
| 2021/0029789 A1* | 1/2021 | Ganick | G06N 3/08 | |

FOREIGN PATENT DOCUMENTS

| | | | | |
|---|---|---|---|---|
| EP | 2575077 A2 * | 4/2013 | | G06K 9/00818 |
| JP | 2009-044683 A | 2/2009 | | |
| JP | 2009-060566 A | 3/2009 | | |
| JP | 2010146378 A | 7/2010 | | |
| JP | 2011-242877 A | 12/2011 | | |
| JP | 2012-070298 A | 4/2012 | | |
| JP | 2012-157080 A | 8/2012 | | |
| JP | 2012157080 A * | 8/2012 | | |
| JP | 2012178866 A | 9/2012 | | |
| JP | 2016105574 A | 6/2016 | | |
| JP | 2019067365 A | 4/2019 | | |

OTHER PUBLICATIONS

Kimura, "This is Okubo Design Office [Extra]. Create professional-looking videos with 'Adobe Creative Suite 3Production Premium'.", Mac Fan, vol. 16, No. 8, Mynavi Publishing Corporation, Aug. 1, 2008, 5 pages.

Wang et al., "Color Design for Illustrative Visualization", IEEE Transactions on Visualization and Computer Graphics, vol. 14, No. 6, Nov./Dec. 2008, Retrieved from the Internet, URL:https://ieeexplore.ieee.org/document/4658198, pp. 1739-1746.

* cited by examiner

IMAGE PROCESSING APPARATUS

CROSS-REFERENCE TO RELATED APPLICATIONS

This application is based on and claims priority to Japanese Patent Application No. 2019-133786 filed on Jul. 19, 2019, the content of which is incorporated herein by reference in its entirety.

FIELD

The present invention relates to an image processing apparatus.

BACKGROUND

In the related art, in order to designate a particular color from among colors included in a color image, a graphic, such as a color wheel or bar, that represents a color space is used (for example, refer to Japanese Unexamined Patent Application, Publication No. 2011-242877; Japanese Unexamined Patent Application, Publication No. 2009-044683; Japanese Unexamined Patent Application, Publication No. 2012-157080; and Japanese Unexamined Patent Application, Publication No. 2012-070298). A color is expressed in three elements. In Japanese Unexamined Patent Application, Publication No. 2011-242877, and Japanese Unexamined Patent Application, Publication No. 2012-070298, hue, saturation, and lightness are used as the three elements, and, in Japanese Unexamined Patent Application, Publication No. 2009-044683, and Japanese Unexamined Patent Application, Publication No. 2012-157080, hue, saturation, and luminance are used as the three elements. Respective positions in a graphic are displayed by colors corresponding to those positions.

SUMMARY

An aspect of the present disclosure provides an image processing apparatus that designates a particular color from among colors included in a color image, the image processing apparatus including a graphical image generator that generates a first graphical image and a second graphical image, and a mode switching unit that switches between a first display mode in which the first graphical image is displayed on a display and a second display mode in which the second graphical image is displayed on the display, wherein each of the first graphical image and the second graphical image includes, a color wheel, which is a circular graphic representing a two-dimensional color space of hue and saturation and in which a position in a circumferential direction indicates a hue, and a distance from a center of the color wheel in its radial direction indicates a saturation, and a lightness bar, which is a bar-shaped graphic representing a one-dimensional color space of lightness and in which a position in a longitudinal direction of the lightness bar indicates a lightness, wherein, in the first graphical image, each position in the color wheel has a hue and a saturation corresponding to its position, and each position in the lightness bar has a lightness corresponding to its position, and wherein, in the second graphical image, a distribution indicating hue and saturation of colors contained in the color image in the two-dimensional color space is superposed on the color wheel, and a distribution indicating lightness of colors included in the color image in the one-dimensional color space is superposed on the lightness bar.

DETAILED DESCRIPTION OF EMBODIMENTS

An image processing apparatus 1 according to an embodiment will now be described with reference to the drawings.

Figure 1:
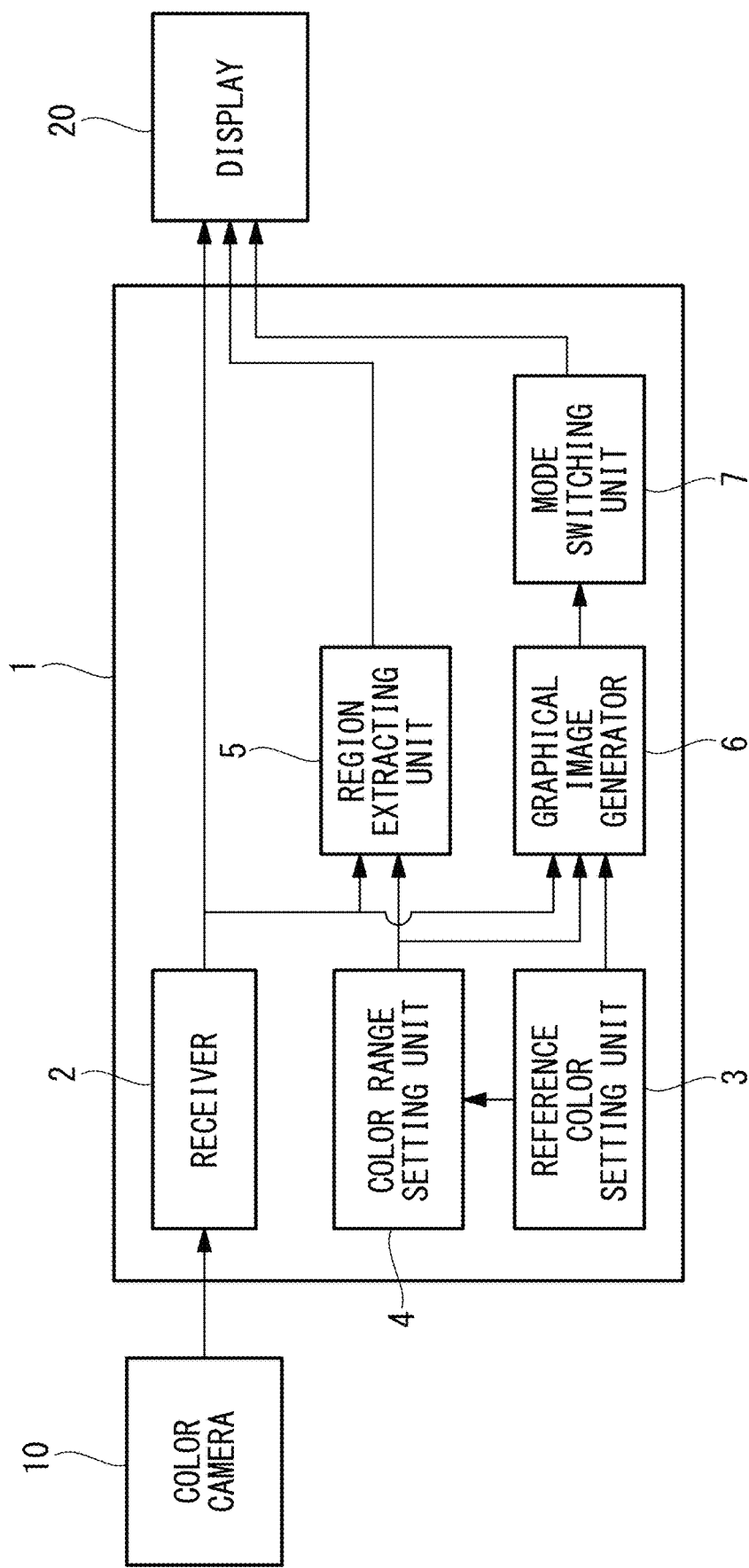
FIG. 1 is a block diagram illustrating the configuration of an image processing apparatus according to an embodiment.
Figure 2:
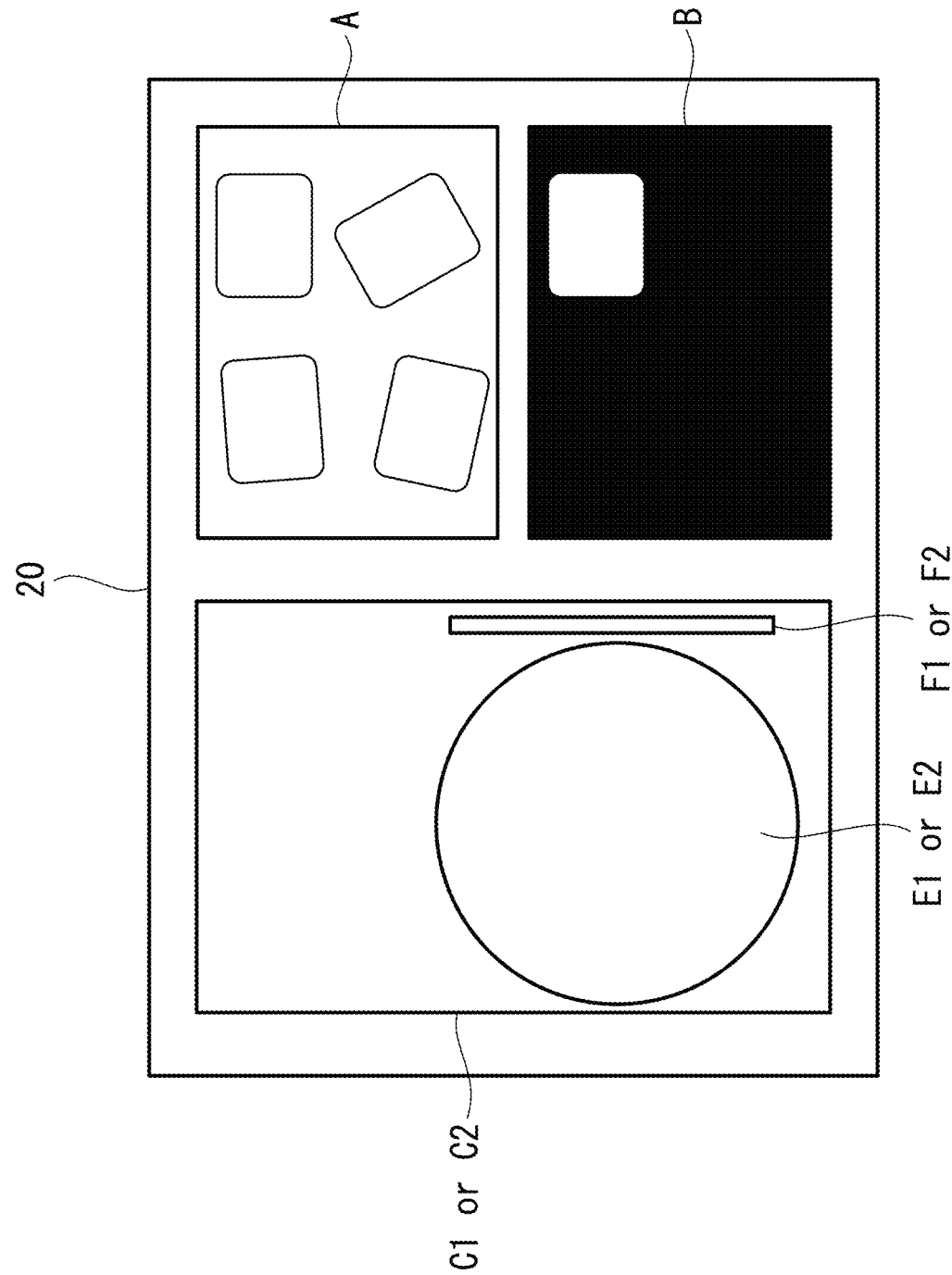
FIG. 2 is a diagram illustrating one example of a displayed image on a display, the display showing a color image, an extracted image, and a graphical image in a display.

As illustrated in FIG. 1, the image processing apparatus 1 is connected to a color camera 10 and a display 20, and receives a color image A from the color camera 10. As illustrated in FIG. 2, the image processing apparatus 1 outputs the color image A, an extracted image B generated from the color image A, and one of two graphical images C1 and C2 so that the color image A, the extracted image B, and the graphical image C1 or C2 are displayed on the display 20.

Figure 3:
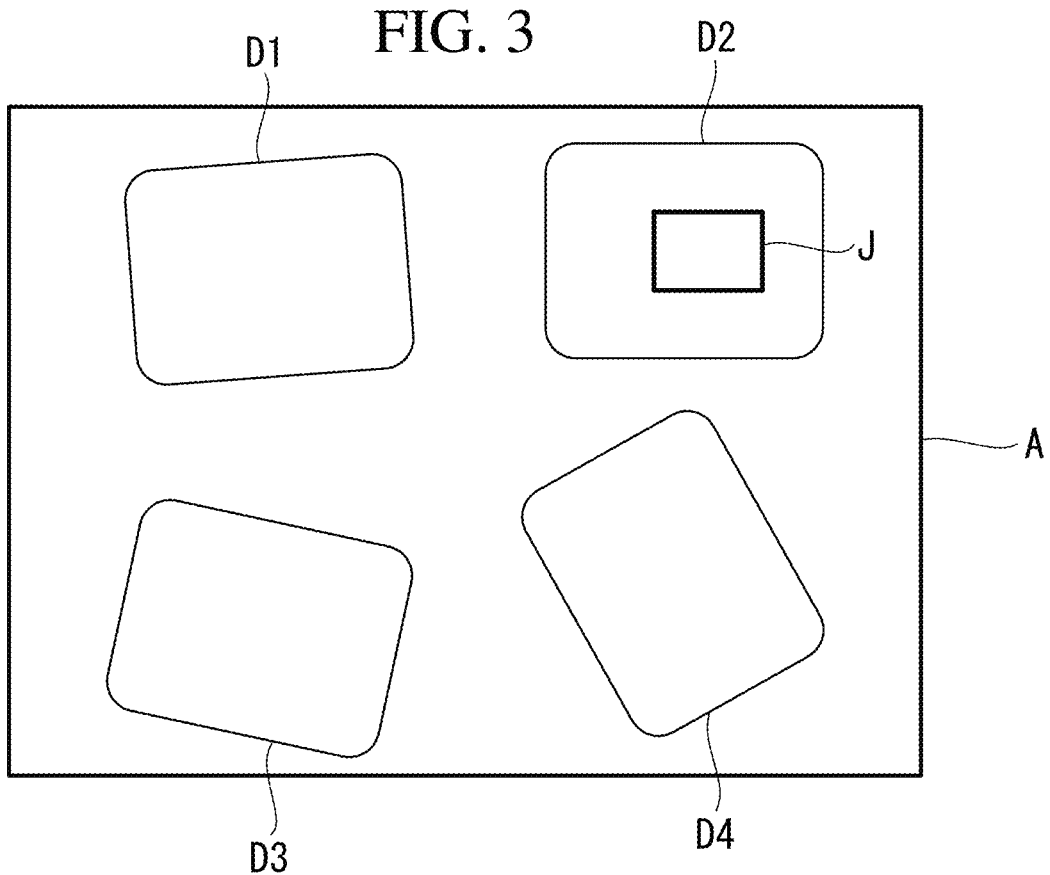
FIG. 3 is a diagram illustrating one example of a color image.
Figure 4:
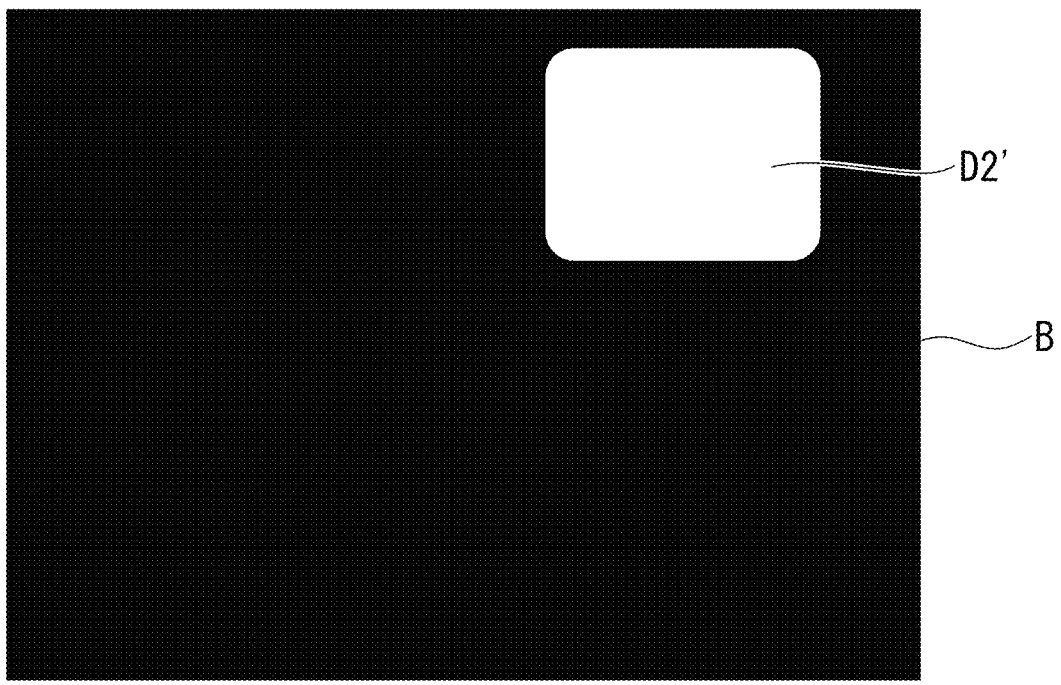
FIG. 4 is a diagram illustrating one example of an extracted image generated from the color image illustrated in FIG. 3.

As illustrated in FIG. 3, the color image A includes, for example, multiple objects D1, D2, D3, and D4 of different colors. On the basis of the input operation of the user, the image processing apparatus 1 specifies a particular color from among those colors included in the color image A, and, as illustrated in FIG. 4, generates the extracted image B in which only a region D2' having the particular color is extracted from the color image A.

Figure 5:
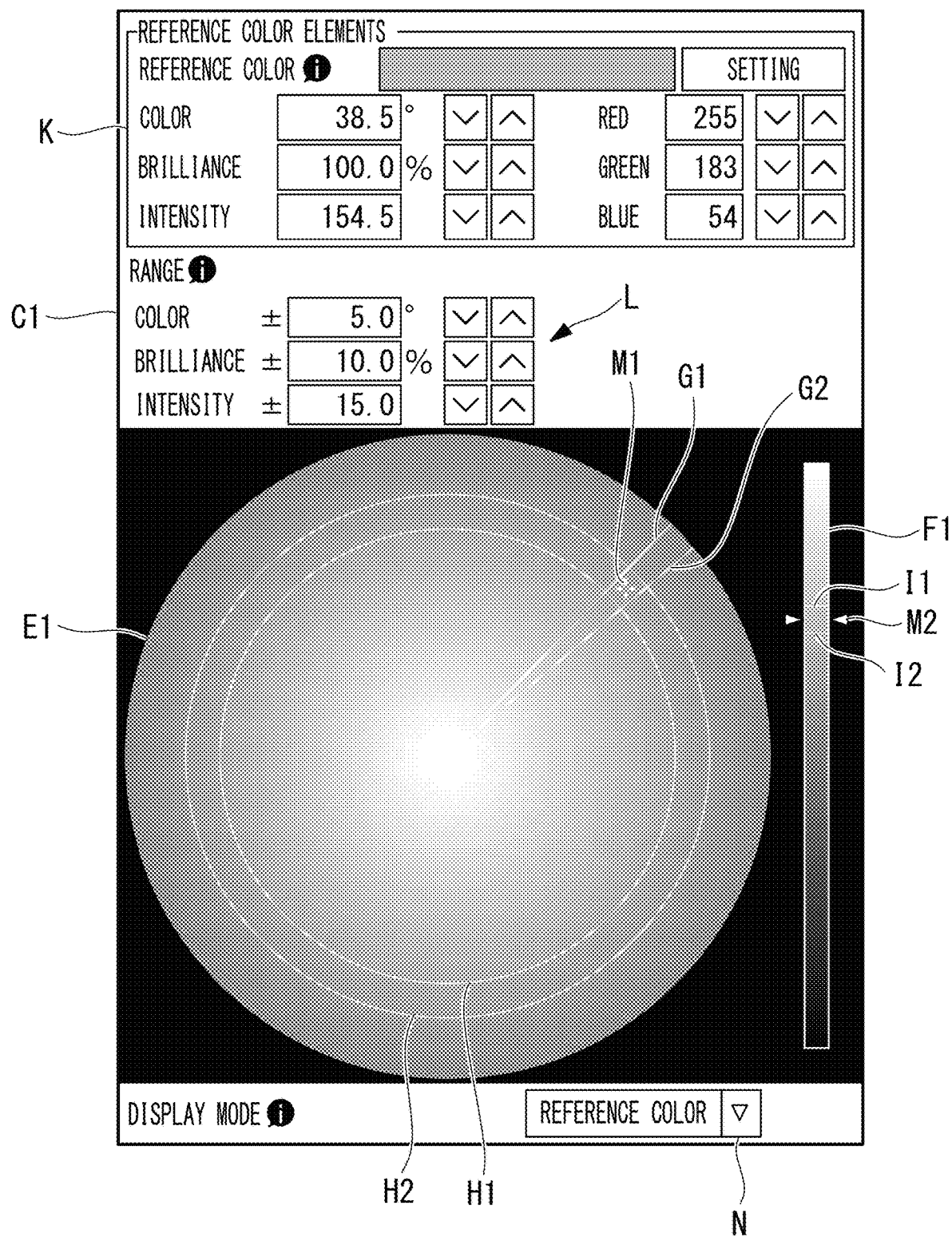
FIG. 5 is a diagram illustrating one example of a first graphical image displayed in a first display mode.
Figure 6:
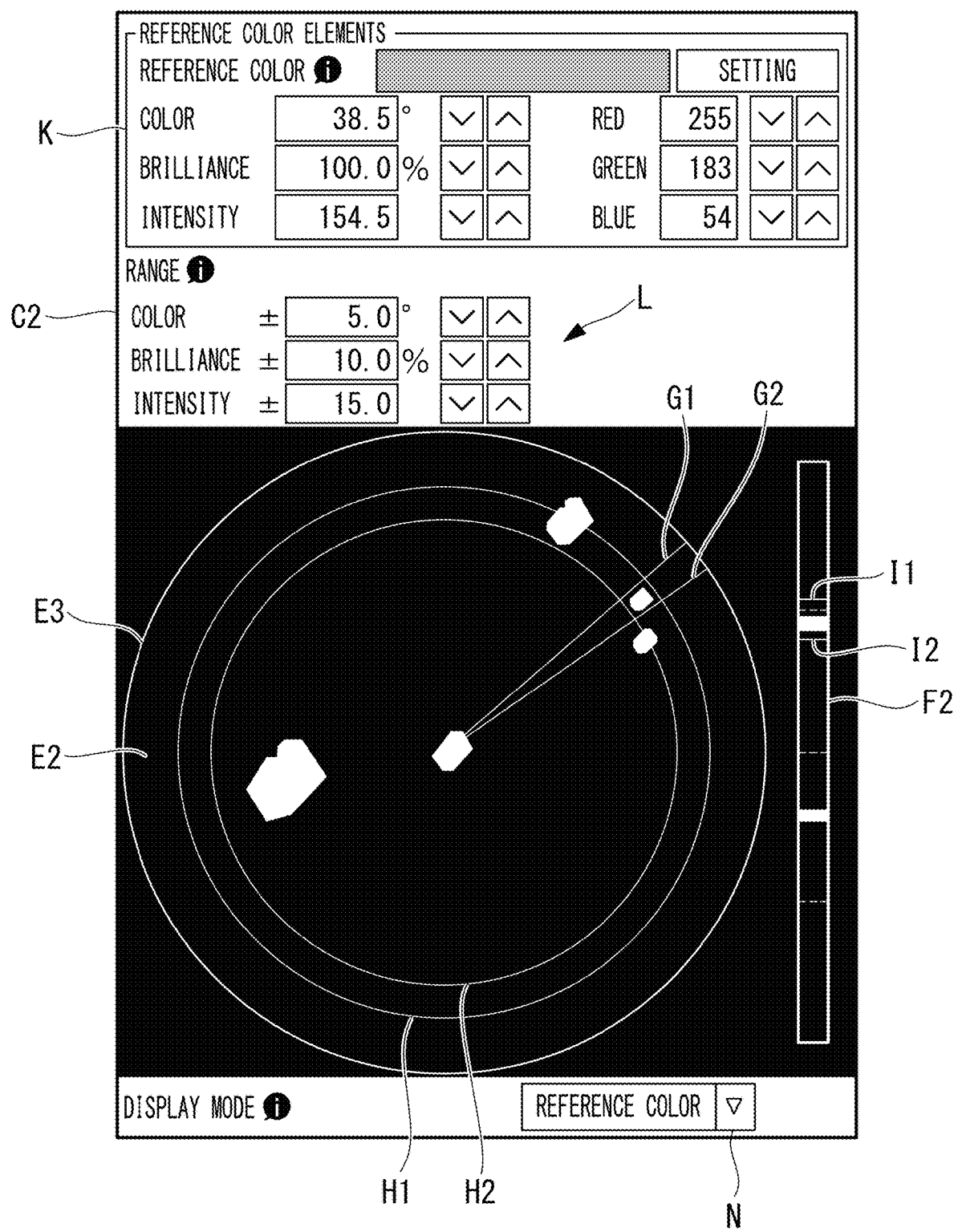
FIG. 6 is a diagram illustrating one example of a second graphical image displayed in a second display mode.

As illustrated in FIGS. 5 and 6, the first graphical image C1 includes a color wheel E1, a lightness bar F1, boundary lines G1, G2, H1, and H2 on the color wheel E1, and boundary lines I1 and I2 on the lightness bar F1. The second graphical image C2 includes a color wheel E2, a lightness bar F2, boundary lines G1, G2, H1, and H2 on the color wheel E2, and boundary lines I1 and I2 on the lightness bar F2. As described below, the graphical images C1 and C2 are generated by a graphical image generator 6 in the image processing apparatus 1.

The color wheels E1 and E2 are circular graphics that indicate the two-dimensional color space of hue and saturation. The hue gradually changes in the circumferential direction about the center of each of the color wheels E1 and E2. The saturation gradually increases from the center toward the radially outer side of each of the color wheels E1 and E2, and the centers of the color wheels E1 and E2 indicate white. The position in the circumferential direction of the color wheels E1 and E2 indicates the hue, and the distance from the center in the radial direction of the color wheels E1 and E2 indicates the saturation. The lightness bars F1 and F2 are bar-shaped graphics that indicate the one-dimensional color space of lightness. The lightness gradually changes in the longitudinal direction of the lightness bars F1 and F2. The position in the longitudinal direction of the lightness bars F1 and F2 indicates the lightness.

A pair of boundary lines (first boundary lines) G1 and G2 are lines that indicate the range of hue, and are straight lines that extend radially outward from the center of the color wheel E1 or E2. A pair of boundary lines (second boundary lines) H1 and H2 are lines that indicate the range of saturation, and are concentric circles concentric with the color wheel E1 or E2. A pair of boundary lines (third boundary lines) I1 and I2 are lines that indicate the range of lightness, and are straight lines that extend in the width direction of the lightness bar F1 or F2.

As illustrated in FIG. 1, the image processing apparatus 1 includes a receiver 2, a reference color setting unit 3, a color range setting unit 4, a region extracting unit 5, the graphical image generator 6, and a mode switching unit 7. In one example, the image processing apparatus 1 is a computer. In other words, the image processing apparatus 1 is includes a processor, such as a central processing unit, and a storage that includes storage devices such as a RAM, a ROM, and the like. The image processing apparatus 1 also includes an input unit through which the user performs an input operation to the image processing apparatus 1, and examples of the input unit are input devices such as a mouse, a keyboard, and a touch panel. The storage stores an image processing program. The processor executes processing in accordance with the image processing program so that the units 3, 4, 5, 6, and 7 perform the functions described below.

The receiver 2 receives the color image A from the color camera 10 by wire or wireless. The color image A is transmitted from the receiver 2 to the region extracting unit 5 and the graphical image generator 6. Moreover, the color image A is output to the display 20 via the image processing apparatus 1.

The reference color setting unit 3 sets, on the basis of the input operation of the user to the image processing apparatus 1, the reference color that serves as a reference for extracting a region from the color image A. For example, as illustrated in FIG. 3, the input operation of the user is the operation of selecting a rectangular range J by using an input device such as a mouse from the color image A displayed on the display 20. The rectangular range J may include multiple colors having different hues, saturations, and lightness values. The reference color setting unit 3 sets the average color of the colors included in the rectangular range J to be the reference color. Alternatively, the reference color setting unit 3 may set the reference color by a different method, such as setting the color having the highest occurrence rate among the colors included in the rectangular range J to be the reference color. The user can designate a desired color to be the reference color by selecting, from the color image A, a rectangular range J surrounding the region of the desired color.

The input operation of the user performed to set the reference color may be an operation of inputting the hue, saturation, and lightness values of the reference color to the image processing apparatus 1 by using an input device such as a keyboard. For example, as illustrated in FIGS. 5 and 6, each of the graphical images C1 and C2 includes a region K that displays values of hue (color), brilliance (saturation), and intensity (lightness) of the reference color. The user can designate a desired color to be the reference color by inputting, into the region K, the values of hue, saturation, and lightness of the desired color.

On the basis of the reference color set by the reference color setting unit 3, the color range setting unit 4 sets a color range that includes the reference color. In other words, the color range setting unit 4 sets ranges of hue, saturation, and lightness that respectively include the hue, saturation, and lightness of the reference color. For example, the width of the hue range, the width of the saturation range, and the width of the lightness range are set as defaults. The color range setting unit 4 sets the hue range having a default width centered on the hue of the reference color, sets the saturation range having a default width centered on the saturation of the reference color, and sets the lightness range having a default width centered on the lightness of the reference color.

The color range setting unit 4 changes each of the ranges of hue, saturation, and lightness on the basis of the input operation of the user to the image processing apparatus 1. As described below, according to the ranges set by the color range setting unit 4, the boundary lines G1, G2, H1, H2, I1, and I2 are superposed upon the graphical images C1 and C2 displayed on the display 20. For example, the input operation of the user is an operation of using a mouse to drag the boundary lines G1, G2, H1, H2, I1, and I2 to desired positions on the graphical images C1 and C2 displayed on the display 20. The color range setting unit 4 changes the ranges of hue, saturation, and lightness according to the positions of the boundary lines G1, G2, H1, H2, I1, and I2 after dragging.

The input operation of the user performed to change the ranges of hue, saturation, and lightness may be an operation of inputting ranges of hue, saturation, and lightness to the image processing apparatus 1 by using an input device such as a keyboard. For example, as illustrated in FIGS. 5 and 6, each of the graphical images C1 and C2 includes a region L that displays the widths of the ranges of hue, saturation, and lightness. The user can change the ranges of hue, saturation, and lightness by inputting desired widths to the region L.

The region extracting unit 5 generates an extracted image B from a color image A on the basis of the color range set by the color range setting unit 4. Specifically, the region extracting unit 5 extracts, from the color image A, a region D2' having a hue, a saturation, and a lightness within the ranges of hue, saturation, and lightness set by the color range setting unit 4, and generates an extracted image B displaying only the extracted region D2'. For example, as illustrated in FIG. 4, the extracted image B is a black-and-white image in which the background is indicated in black and only the extracted region D2' is indicated in white. The extracted image B is transmitted from the region extracting unit 5 to the display 20, and is displayed on the display 20.

When the user changes the ranges of hue, saturation, and lightness, the region to be extracted from the color image A by the region extracting unit 5 also changes. The user changes the ranges of hue, saturation, and lightness while observing the extracted image B displayed on the display 20; thus, the respective ranges of hue, saturation, and lightness with which the entirety of the desired object D2 is extracted can be intuitively and easily specified.

The graphical image generator 6 generates a first graphical image C1 that presents the reference color to the user, and a second graphical image C2 that presents a distribution, in the color space, of colors included in the color image A to the user. The graphical images C1 and C2 are output to and displayed on the display 20 via the mode switching unit 7 from the graphical image generator 6. As described below, in the mode switching unit 7, only one of the graphical images C1 and C2 is selected, and only the selected graphical image C1 or C2 is output to the display 20.

As described above, the first graphical image C1 includes the color wheel E1 and the lightness bar F1. Each position on the color wheel E1 is indicated by the hue and saturation indicated by that position. Thus, the color wheel E1 is a colorful graphic in which the hue gradually changes in the circumferential direction and the saturation gradually changes in the radial direction. Each position on the lightness bar F1 is indicated by the lightness indicated by that position.

The graphical image generator 6 adds, to the color wheel E1 and the lightness bar F1, marks M1 and M2 indicating the reference color set by the reference color setting unit 3. Specifically, the graphical image generator 6 adds a first mark M1 to a position that indicates the hue and the saturation of the reference color in the color wheel E1. The mark M1 is, for example, a white cross. In addition, the graphical image generator 6 adds a second mark M2 to a position that indicates the lightness of the reference color in the lightness bar F2. The mark M2 is, for example, an arrow.

As described above, the second graphical image C2 includes the color wheel E2 and the lightness bar F2. The color wheel E2 is indicated by a uniform color, for example, black. The graphical image generator 6 generates a distribution of colors included in the color image A in a two-dimensional color space of hue and saturation, and superposes the distribution on the color wheel E2. The distribution is a scatter plot consisting of many datapoints, and one datapoint indicates a set of hue and saturation. In the case of the color image A illustrated in FIG. 3, the colors included in the color image A are roughly categorized into five colors that correspond to the background and four objects D1, D2, D3, and D4, respectively. Thus, datapoint clusters are formed in five regions in the color wheel E2. In FIG. 6, the clusters are indicated as white regions in the color wheel E2. In addition, the graphical image generator 6 generates a distribution of colors included in the color image A in a one-dimensional color space of lightness, and superposes the distribution on the lightness bar F2. The distribution is a scatter plot consisting of many datapoints, and one datapoint indicates one lightness.

The datapoints are indicated in a color different from the color of the color wheel E2. For example, when the color wheel E2 is black, the datapoints are indicated in white. Each datapoint on the color wheel E2 may be indicated by depth corresponding to the occurrence rate of the set of hue and saturation indicated by the position of that datapoint in the color image A. Each datapoint on the lightness bar F2 may be indicated by depth corresponding to the occurrence rate of the lightness indicated by the position of that datapoint in the color image A. For example, the color of a datapoint is indicated in a gray scale. The closer the color of a datapoint is to white, the higher the occurrence rate of the set of hue and saturation or the lightness indicated by the position of that datapoint; furthermore, the closer the color of a datapoint is to black, the lower the occurrence rate of the set of hue and saturation or the lightness indicated by the position of that datapoint.

The second graphical image C2 may further have a ring-shaped hue region E3 on the outer periphery of the color wheel E2. The hue region E3 is a graphic indicating a color space of hue in which the hue gradually changes in the circumferential direction, as in the color wheels E1 and E2. Each position in the hue region E3 is indicated by the hue indicated by that position. In other words, as with the color wheel E1, the hue region E3 is a colorful graphic in which the color gradually changes in the circumferential direction.

In addition, the graphical image generator 6 superposes, onto the color wheels E1 and E2 and the lightness bars F1 and F2, the boundary lines G1, G2, H1, H2, I1, and I2 on the basis of the color ranges set by the color range setting unit 4. Specifically, the graphical image generator 6 superposes a pair of boundary lines G1 and G2 on the boundaries of the hue range in each of the color wheels E1 and E2, superposes a pair of boundary lines H1 and H2 on the boundaries of the saturation range in each of the color wheels E1 and E2, and superposes a pair of boundary lines I1 and I2 on the boundaries of the lightness range in each of the lightness bars F1 and F2. The graphical image generator 6 changes the positions of the respective boundary lines G1, G2, H1, H2, I1, and I2 in response to the input operation of the user to change the ranges of hue, saturation, and lightness described above.

The mode switching unit 7 switches between the first display mode and the second display mode on the basis of the input operation of the user to the image processing apparatus 1. For example, each of the graphical images C1 and C2 includes a mode selection column N so that the user can select the display mode. The input operation of the user is an operation of selecting one of the first display mode and the second display mode by using an input device, such as a mouse, from a pull-down menu displayed in the mode selection column N. The mode switching unit 7 selects the first graphical image C1 when the first display mode is selected, and causes the display 20 to display the first graphical image C1. Meanwhile, the mode switching unit 7 selects the second graphical image C2 when the second display mode is selected, and causes the display 20 to display the second graphical image C2.

Next, the operation of the image processing apparatus 1 is described. A color image A acquired by the color camera 10 is displayed on the display 20 via the image processing apparatus 1. In the initial state, the first display mode is selected by the mode switching unit 7, and the first graphical image C1 and the color image A are displayed on the display 20.

On the basis of the color image A displayed on the display 20, the user performs an input operation to set the reference color for extracting the desired object D2 from the color image A. For example, the user clicks the "setting button" in the first graphical image C1 by using a mouse to validate the input operation, and performs an input operation of setting the reference color by using an input device. For example, the user uses a mouse to set a rectangular range J, which surrounds one portion of the object D2 to be extracted in the color image A, on the color image A and thereby selects the rectangular range J from the object D2 to be extracted in the color image A.

On the basis of the input operation of the user, for example, the reference color is set by the reference color setting unit 3 on the basis of the colors included in the selected rectangular range J. In addition, the ranges of hue, saturation, and lightness that respectively include the hue, saturation, and lightness of the set reference color are automatically set by the color range setting unit 4.

After the reference color and the ranges are set, the graphical image generator 6 adds marks M1 and M2 and boundary lines G1, G2, H1, H2, I1, and I2 to the color wheel E1 and the lightness bar F1 in the first graphical image C1. Then a first graphical image C1 containing the marks M1 and M2 and the boundary lines G1, G2, H1, H2, I1, and I2 is displayed on the display 20. Furthermore, the region extracting unit 5 generates, from the color image A, an extracted image B in which only the object D2 is extracted, and the extracted image B is displayed on the display 20. Furthermore, the graphical image generator 6 generates the distribution indicating hue and saturation and the distribution indicating lightness, and the distributions are superposed on the color wheel E2 and the lightness bar F2 in the second graphical image C2.

The user performs an input operation of switching between the first display mode and the second display mode by using an input device. In this manner, the mode switching unit 7 switches between the first graphical image C1 and the second graphical image C2 displayed on the display 20. The user can refer to the reference color selected by her/himself on the color wheel E1 by selecting the first display mode, and can intuitively confirm the reference color. In addition, by selecting the second display mode, the user can intuitively and easily confirm whether the color of the object D2 to be extracted in the color image A is appropriately included in the set color range, and, moreover, can intuitively adjust the color range.

Specifically, the user can confirm the hue, saturation, and lightness of the reference color on the basis of the positions of the marks M1 and M2 on the color wheel E1 and the lightness bar F1. Moreover, the user can identify the cluster to which the reference color belongs from among the distributions on the color wheel E2 and the lightness bar F2 on the basis of the positions of the marks M1 and M2 on the color wheel E1 and the lightness bar F1. On the basis of the positional relationship between the distribution of the datapoints of the cluster to which the reference color belongs and the boundary lines G1, G2, H1, H2, I1, and I2, the user can confirm whether the currently set ranges of hue, saturation, and lightness include all of the hue, saturation, and lightness of the object D2 to be extracted.

In addition, on the basis of the extracted image B displayed on the display 20, the user can confirm whether the object D2 to be extracted is appropriately extracted from the color image A. If the object D2 to be extracted is not appropriately extracted, the user changes the range of hue, saturation, or lightness by moving the boundary line G1, G2, H1, H2, I1, or I2 in the second graphical image C2 in accordance to the distribution. Changing the range of hue, saturation, or lightness updates the extracted image B displayed on the display 20. Until an appropriate extracted image B is generated, the user repeatedly changes the range of hue, saturation, or lightness and confirms the extracted image B. When datapoints are indicated by depths corresponding to the occurrence rates of the colors, the positions of the boundary lines G1, G2, H1, H2, I1, and I2 are adjusted so that the color having a high occurrence rate is included in the ranges; in this manner, the color range can be more easily adjusted.

Figure 7:
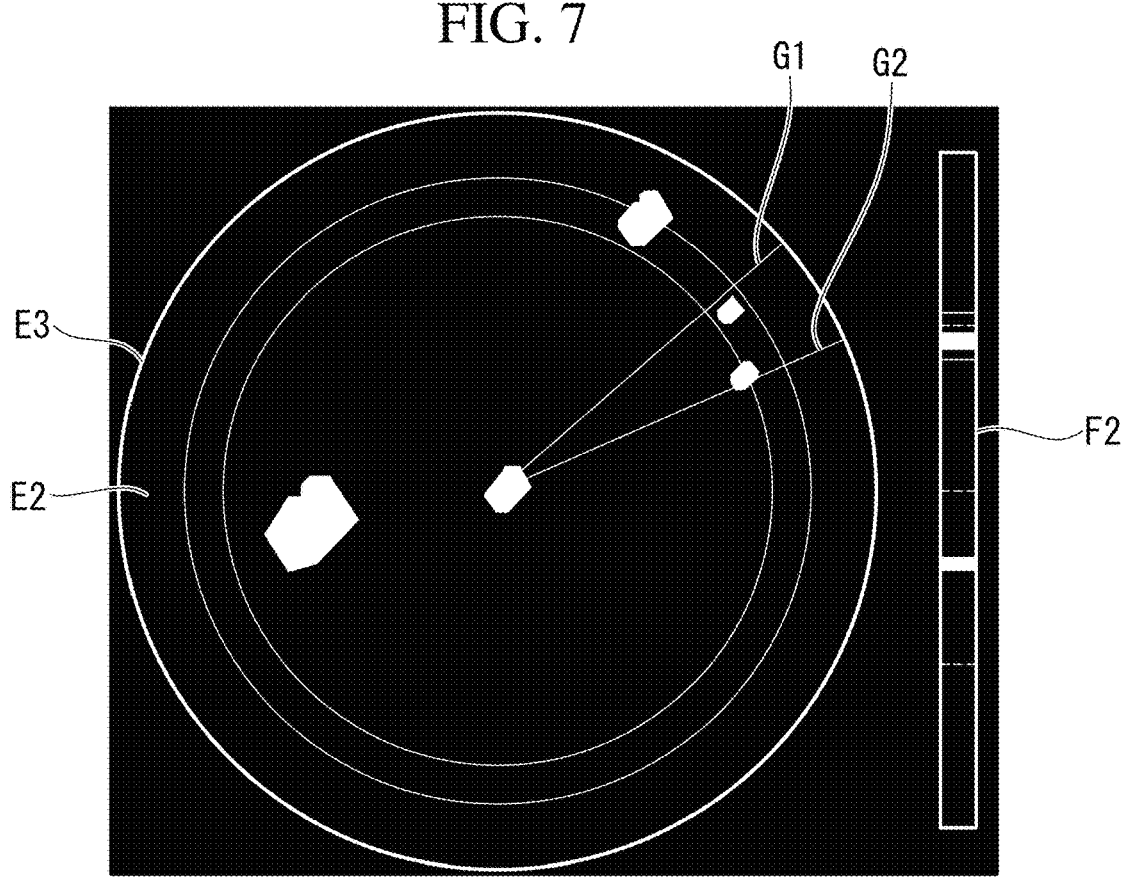
FIG. 7 is a diagram illustrating another example of the second graphical image displayed in the second display mode.
Figure 8:
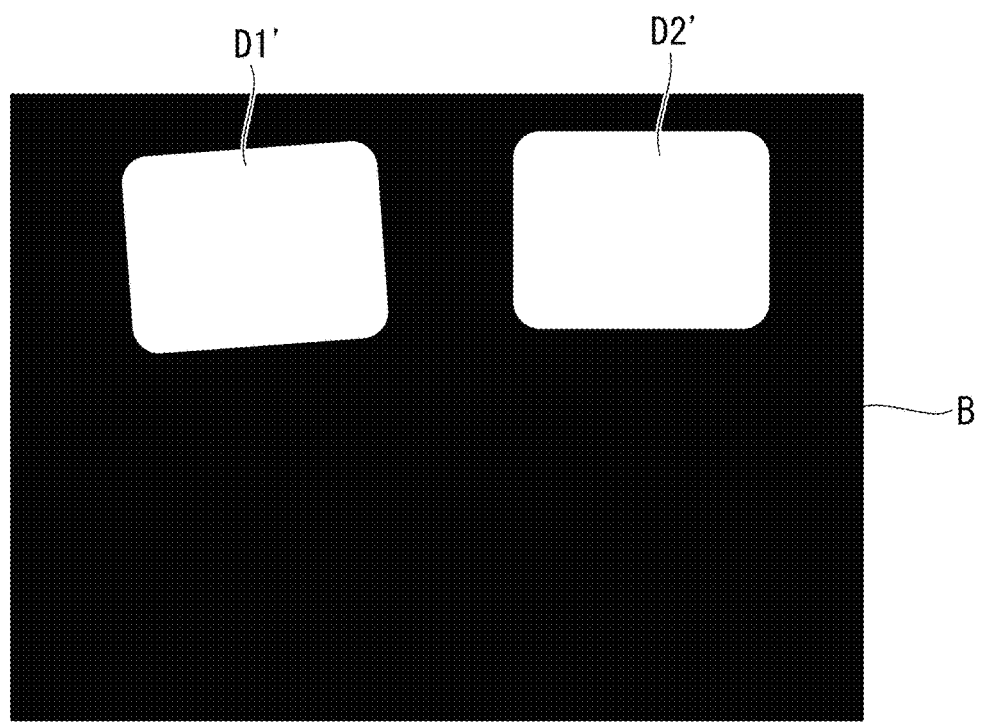
FIG. 8 is a diagram illustrating another example of an extracted image generated from the color image illustrated in FIG. 3.

For example, when a brown object D1 and an orange object D2 are included in the color image A, when the object to be extracted is the orange object D2, and when, as illustrated in FIG. 7, the hue range defined by the boundary lines G1 and G2 is excessively wide, not only a region D2' of the orange object D2 but also a region D1' of the brown object D1 are extracted, as illustrated in FIG. 8. As such, whether the ranges of hue, saturation, and lightness are appropriate or not can be intuitively and easily confirmed by comparing the second graphical image C2 and the extracted image B. Moreover, according to this embodiment, for another color image also, whether the color setting ranges are appropriate or not can be confirmed by confirming the distribution of colors in the second display mode.

The invention claimed is:

1. An image processing apparatus that designates a particular color from among colors included in a color image, the image processing apparatus comprising:
   a display; and
   a processor,
   wherein the processor is configured to conduct a graphical image generation process that generates a first graphical image and a second graphical image,
   wherein at least the first graphical image includes at least a color wheel, the color image, and an extracted image which are displayed simultaneously,
   wherein the color wheel is a circular graphic representing a two-dimensional color space of hue and saturation and in which a position in a circumferential direction indicates a hue and a distance from a center of the color wheel indicates a saturation,
   wherein, in the first graphical image, each position in the color wheel has a corresponding hue and saturation,
   wherein the processor is further configured to conduct:
     a color range setting process that changes an upper limit and a lower limit of hue and an upper limit and a lower limit of saturation in accordance with an input from a user; and
     an extracted image generating process that extracts, from the color image, pixels having hue and saturation within a range defined by the upper limit of the hue, the lower limit of the hue, the upper limit of the saturation, and the lower limit of the saturation changed by the color range setting process, and generates the extracted image just after at least one of the upper limit of the hue, the lower limit of the hue, the upper limit of the saturation, or the lower limit of the saturation is changed.

2. The image processing apparatus according to claim 1, wherein:
   the processor is configured to conduct a reference color setting process that sets a reference color on the basis of an input operation of a user,
   wherein, in the graphical image generation process, the processor adds a first mark at a position that indicates a hue and a saturation of the reference color in the color wheel in the first graphical image, and adds a second mark at a position that indicates a lightness of the reference color in the lightness bar in the first graphical image.

3. The image processing apparatus according to claim 1, wherein
   each of the first graphical image and the second graphical image includes a lightness bar which is a bar-shaped graphic representing a one-dimensional color space of lightness and in which a position in a longitudinal direction of the lightness bar indicates a lightness,
   each position in the lightness bar has a lightness corresponding to its position, and
   a distribution indicating lightness of colors includes in the color image in the one-dimensional color space is superposed on the lightness bar.

4. The image processing apparatus according to claim 3, wherein each of the first graphical image and the second graphical image includes:
   a pair of first boundary lines that are straight lines extending radially outward from the center of the color wheel and that indicate the range of hue,
   a pair of second boundary lines that are concentric circles concentric with the color wheel and that indicate the range of saturation, and a pair of third boundary lines that are straight lines extending in a width direction of the lightness bar and that indicate the range of lightness.

5. The image processing apparatus according to claim 1, wherein the processor is configured to conduct a mode switching process that switches between a first display mode in which the first graphical image is displayed on a display and a second display mode in which the second graphical image is displayed on the display.

6. The image processing apparatus according to claim 1, wherein, in the second graphical image,
   each datapoint in the distribution on the color wheel is indicated by depth corresponding to an occurrence rate of a set of hue and saturation corresponding to the position of the datapoint in the color image, and
   each datapoint in the distribution on the lightness bar is indicated by depth corresponding to an occurrence rate of a lightness corresponding to the position of the datapoint in the color image.

7. An image processing apparatus that designates a particular color from among colors included in a color image which includes an object color image of an object, the image processing apparatus comprising:
   a display; and
   a processor,
   wherein the processor is configured to conduct a graphical image generation process that generates a first graphical image and a second graphical image,
   wherein at least the first graphical image includes at least a color wheel, the color image, and an extracted image which are displayed simultaneously,
   wherein the color wheel is a circular graphic representing a two-dimensional color space of hue and saturation and in which a position in a circumferential direction indicates a hue and a distance from a center of the color wheel indicates a saturation,
   wherein, in the first graphical image, each position in the color wheel has a corresponding hue and saturation,
   wherein the processor is further configured to conduct:
      a color range setting process that changes an upper limit and a lower limit of hue and an upper limit and a lower limit of saturation in accordance with an input from a user; and
      an extracted image generating process that extracts, from the color image, pixels having hue and saturation within a range defined by the upper limit of the hue, the lower limit of the hue, the upper limit of the saturation, and the lower limit of the saturation changed by the color range setting process, and generates the extracted image for displaying the extracted pixels only just after at least one of the upper limit of the hue, the lower limit of the hue, the upper limit of the saturation, or the lower limit of the saturation is changed,
   wherein the processor is configured to generate the extracted image such that part of the object is omitted when at least one of the upper limit of the hue, the lower limit of the hue, the upper limit of the saturation, and the lower limit of the saturation set through the color range setting process exclude those saturations and/or hues of the omitted part, and
   wherein the processor is configured to conduct, when at least one of the upper limit of the hue, the lower limit of the hue, the upper limit of the saturation, and the lower limit of the saturation are changed through the color range setting a process that excludes the said saturations and/or hues of the omitted part, and a displaying process that displays the extracted image in which the part is omitted just after at least one of the upper limit of the hue, the lower limit of the hue, the upper limit of the saturation, or the lower limit of the saturation is changed.

8. The image processing apparatus according to claim 1, wherein each of the first graphical image and the second graphical image includes at least the color wheel, the color image, and the extracted image which are displayed simultaneously,
   wherein, in the second graphical image, a distribution indicating hue and saturation of colors contained in the color image in the two-dimensional color space is superposed on the color wheel.

9. The image processing apparatus according to claim 7, wherein each of the first graphical image and the second graphical image includes at least the color wheel, the color image, and the extracted image which are displayed simultaneously,
   wherein, in the second graphical image, a distribution indicating hue and saturation of colors contained in the color image in the two-dimensional color space is superposed on the color wheel.

* * * * *